Patented Mar. 16, 1948

2,438,092

UNITED STATES PATENT OFFICE 2,438,092

N-SULFODICARBOXYLIC ACID ASPARTATES

Kathryn L. Lynch, Stamford, Conn., assignor to American Cyanamid Company, New York, N. Y., a corporation of Maine No Drawing. Application September 10, 1943, Serial No. 501,851

9 Claims. (Cl. 260—482)

This invention relates to aspartate amides of aliphatic sulfodicarboxylic acids; i. e. to aliphatic sulfodicarboxylic acid monoamides wherein the amide-forming nitrogen is also the amino nitrogen atom of an aminosuccinic acid. The invention includes the compounds themselves, their methods of preparation, and wetting, emulsifying, demulsifying and detergent compositions containing them.

The compounds of the present invention, the preparation of which will be presently described, may be represented by the general formula:

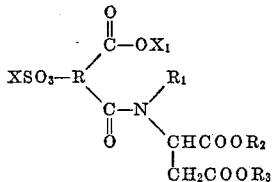

in which R is the residue of an aliphatic polycarboxylic acid, $R_1$ is an alkyl, alkoxyalkyl or hydroxyalkyl radical, $R_2$ and $R_3$ are radicals of the group consisting of hydrogen, alkyl radicals and cationic salt-forming radicals, and X and $X_1$ are members of the group consisting of H and cationic salt-forming radicals.

The preferred method of preparing my new compounds comprises the steps of reacting an N-alkyl, N-alkoxyalkyl or N-hydroxyalkyl substituted aspartic acid ester with an anhydride of an unsaturated aliphatic polycarboxylic acid and sulfonating the resulting product with an alkaline sulfite. This reaction may be illustrated with maleic anhydride and diethyl N-octadecyl aspartate as follows:

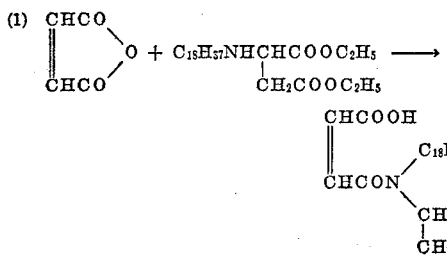

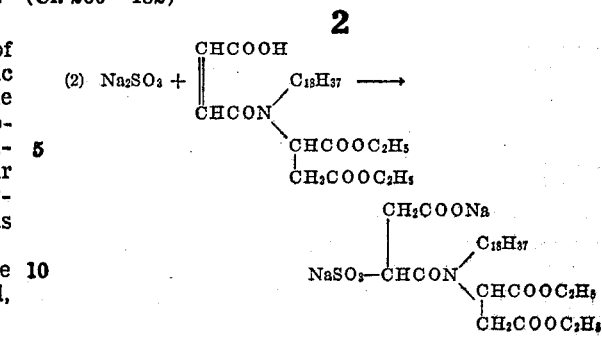

The condensation reaction illustrated is exothermic and proceeds easily to substantial completion in a short period of time, usually in less than one hour upon mixing the reactants together in a mutual solvent. Ordinarily I carry out the reaction at a comparatively low temperature, i. e., from room temperature up to about 95° C. Usually one of the reactants is added slowly to a solution of the other reactant to keep the temperature of the reaction mixture at a reasonably low level. Higher temperatures may, of course, be employed by using solvents having higher boiling points, but the reaction mixture should not be held long at high temperatures because of the danger of decomposing part of the reaction product to undesirable substances.

Since it is usually more desirable to conduct the reaction in a liquid condition, solvents such as carbon tetrachloride, chloroform, acetone, tertiary butanol, benzene, toluene, dioxane, ethers of suitable boiling points such as iso-propyl ether, ethyl ether, etc., and other inert solvents may be employed. In some cases it is also possible to keep the reaction mixture in a liquid condition by merely carrying out the reaction at a temperature above the melting point of the mixture.

Ordinarily I employ substantially equi-molecular proportions of N-alkyl, N-alkoxyalkyl or N-hydroxyalkyl substituted aspartate and acid anhydride or if desired, a slight excess of the acid anhydride. When an excess of aspartate is employed, it will be found that the excess aspartate acts as an amine forming complex salts with the product of the first equation illustrated above. In some cases, however, it may be desirable to form mixed salts and I may do this by sulfonating such complex salts with a suitable bisulfite.

Among the unsaturated aliphatic polycarboxylic acid anhydrides which may be employed in my preferred method, may be mentioned maleic, methylmaleic (citraconic) anhydrides and other alkyl and aryl substituted maleic anhydrides; itaconic, ethyl-itaconic and iso-propyl-itaconic anhydride; glutaconic anhydride; muconic anhydride; aconitic anhydride; 2,5-endomethylene-1,2,5,6-tetrahydrophthalic anhydride; etc.

Although I prefer to prepare my new compounds in the manner outlined above and described in detail in the specific examples, they may be prepared by other methods. I may, for example, start with the anhydride of a sulfonated aliphatic polycarboxylic acid such as sulfo-succinic, sulfo-methylsuccinic, sulfo-dimethylsuccinic, sulfo-iso-propylsuccinic, sulfo-phenylsuccinic, sulfo-glutaric, sulfo-methylglutaric, sulfo-octylglutaric, sulfo-pimelic, sulfo-suberic, sulfosebacic, sulfo-tricarballylic acids and the like. These anhydrides of sulfo-polycarboxylic acids are reacted with substantially equimolar parts of N-alkyl substituted aspartates as described hereinafter to form sulfo acid mono-amides, for example, sulfo-succinamic acid, which may be reacted with a salt-forming base to yield the compounds of the present invention.

Still another method of preparing my new compounds comprises the steps of heating a sulfonated aliphatic polycarboxylic ester with an N-alkyl substituted aspartate followed by treatment with alkali. The ester groups may be split off and the resulting alcohol removed by volatilization, leaving the corresponding polycarboxylic mono-amide alkali salts.

Instead of sulfonating the compounds of the present invention with an alkaline sulfite I may neutralize the free carboxylic acid group (see the product of the reaction Equation 1) with an alkali and then sulfonate by treatment with an alkaline bisulfite instead of an alkaline sulfite as shown in reaction Equation 2. A still further method of sulfonating the polycarboxylic acid mono-amides involves treatment with sulfur dioxide and free alkali in the presence of water.

Although my compounds may be prepared by these various methods described above and also by modifications which will occur to those skilled in the art, I prefer to use the procedure followed in most of the specific examples since this method is easily carried out with readily available materials and involves a minimum of manipulative steps. My preferred method requires no complicated apparatus and yields a product of excellent purity and in practically quantitative amounts. For certain purposes, however, one of the alternative methods may be employed to good advantage in the preparation of my new compounds.

It will be apparent from the foregoing that a wide variety of N-alkyl aspartates may be used. Since the compounds of the present invention will probably find their greatest use as surface active agents the compounds should have, for these purposes, a hydrophobic group and a hydrophilic group. Ordinarily the groups X and $X_1$, in the general formula, are hydrophilic groups. However any of $R_1$, $R_2$ or $R_3$ may also be hydrophilic groups provided, of course, that at least one hydrophobe group be present. Accordingly, $R_2$ and $R_3$ may be hydrophilic radicals such as H, Na, K, $NH_4$ and short chain alkyl radicals such as methyl, ethyl, propyl, ethylol, ethoxypropyl, etc. The groups $R_2$ and $R_3$ may also be hydrophobic alkyl radicals having up to about 20 carbon atoms, if desired.

The group $R_1$ may be hydrophilic if $R_2$ and $R_3$ are hydrophobic in character. Otherwise it may be a hydrophobic alkyl radical having up to about 20 carbon atoms. In general the compounds of the present invention are most efficient as wetting agents and detergents when the total number of carbon atoms in $R_1$, $R_2$ and $R_3$ is twelve or more.

In compounds possessing particular properties, $R_2$ and $R_3$ may be cationic radicals such as Ba, Ca, Zn, Cd, Hg, morpholine, pyridine, etc. These special compounds may be prepared in the manner hereinafter to be described. Accordingly, representative N-substituted aspartates which may be employed in the preparation of my new compounds include those such as dimethyl N-octyl aspartate, diethyl N-decyl aspartate, diamyl N-tetradecyl aspartate, dimethyl N-octadecyl aspartate, di-amyl N-amyl aspartate, disodium N-octadecyl aspartate, di-iso-propyl N-dodecyl aspartate, dibutyl N-octadecyl aspartate and many others.

In most of the specific examples which follow I have employed sodium as the salt-forming radical since sodium sulfite and sodium bisulfite are relatively cheap, easily handled and conveniently obtained. For most purposes my new compounds are of greatest importance in the form of their sodium salts. However, for special purposes I may prefer to use my compounds in the form of the acid mono-amide in which case both X and $X_1$ in the general formula are H. I may also prepare and use for special purposes compounds in which X, $X_1$, $R_2$ and $R_3$ are H. For most purposes, however, my compounds are prepared in the form of salts in which X and $X_1$ in the general formula are salt-forming radicals such as Na, K, Li, $NH_4$, Ba, Ca, Zn, Cu, Cd, Mg, etc. or radicals of an amine such as ethanolamine, morpholine, guanidine, pyridine or other hydrophilic salt-forming radical. In order to introduce those radicals into my new compounds it is not necessary to use them in the form of sulfites or bisulfites since, if desired, I may prepare the free sulfonic acid of the polycarboxylic monoamide and neutralize it with a suitable salt-forming base such as one of the class named. Many of these cationic radicals may also be conveniently introduced by methods of double decomposition with the sodium salt and the salt of a desired metal or cationic radical.

The compounds in the present invention are very soluble in water to give clear solutions of 25–40% concentrations at ordinary temperatures. They are soluble and stable in strong acid solutions, for example, in 16% aqueous nitric acid. They also possess a high calcium tolerance and show wetting, emulsifying de-emulsifying, dispersing, foaming, detergent and other surface active characteristics. They may be employed in many arts for a wide variety of purposes.

They are useful in the textile industry as soaking, wetting, re-wetting, penetrating and carbonizing agents; and in the leather industry for wetting out, soaking, de-liming and bating hides and in tanning, dyeing, sheet-liquoring and stuffing preparations. They are also valuable in disinfectants, in fungicides, and horticultural sprays because of their wetting and penetrating properties. They are also of value in sprays designed to lay dust in many types of industrial operations.

As detergents they may be used alone or with compounds having detergent properties such as soaps, sodium carbonate, tetrasodiumpyrophosphate, tetrasodiumphosphate, sodium hexametaphosphate and with materials which may be added for some other particular purpose such as bulking agents, abrasives, perfumes, borax, boric acid and other soap building agents. Their solubility and resistance to strong alkalis makes them particularly valuble in detergent preparations.

The compounds of the present invention may also be used as emulsifying agents alone or with protective colloids such as glue, casein, starch, gums and other emulsifying aids such as fatty acids, fatty acid esters, fatty alcohols, pine oils, bentonite, clays, carbon black, etc.

The compounds of my invention may also be employed as dispersing agents and are particularly valuable in dispersing pigments and dyes in the preparation of printing pastes and other compositions where pigments or dye-stuffs need to be wetted in order to be dispersed properly.

The compounds described herein are also excellent de-emulsifiers and may be employed to break or resolve emulsions, particularly petroleum emulsions of the oil-in-water type such as are frequent in well drilling operations in the oil industry. Other petroleum emulsions, such as those found in crude or refined oil storage tanks, emulsions formed by the washing of oil with water, emulsions obtained by the hydraulic flooding of oil fields and from treating crude or refined petroleum with various preparations, also may be resolved by treating these emulsions with my compounds in amounts of from one part of my new compounds to 100–20,000 parts of the oil emulsion.

My new compounds are also valuable in many miscellaneous applications such as dye assistants where they act as leveling agents, penetrants and dispersants, etc. They are useful as surface active agents in ore dressing, cyanidation processes, dry-cleaning, glass-cleaning preparations, as introfiers, adhesives, in wall-paper paste, shoe-polishes, cosmetic preparations, cleaning paper mill felts, rinsing, foaming agents, leaching and extracting operations, electro-plating baths, acid pickling baths, etc., as lubricants alone or with animal or vegetable fats or oils, hydrocarbon oils, and many other uses for which surface active agents are commonly utilized.

The invention will now be illustrated in greater detail by means of the following specific examples. It should be understood that although these examples may describe in detail some specific manipulative steps which may be employed in the preparation of the compounds, they are given primarily by way of illustration and the invention in its broader aspects is not to be limited thereto.

*Example 1.—N-octadecyl N-(disodium sulfosuccinyl) dimethyl aspartate*

144 g. (1 mol) dimethyl maleate was added slowly with stirring to a solution of 265 g. (1 mol) of octadecylamine in 500 cc. tertiary butanol at 50° C. The mixture was allowed to stand at 28° C. for 65 hours at which time the reaction was 96.2% complete. 100 g. (1 mol+2% excess) maleic anhydride was then added slowly in portions with agitation to the above described solution of dimethyl N-octadecyl aspartate at a temperature between 50–60° C. The reaction mixture was heated to 85–90° C. and maintained at this temperature for one hour to insure completion of the reaction. The reaction product was sulfonated by slowly adding the maleamic acid solution to a solution of 130 g. (1 mol+4% excess) of sodium sulfite dissolved in 500 cc. of hot water with good agitation. A clear yellow foaming solution was obtained which was concentrated and dried to yield 630 g. of a cream-colored powder which had the following formula

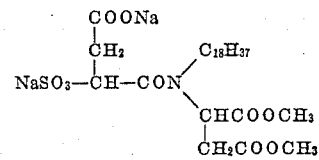

Chemical analysis of the product gave the following results:

|  | Analysis | |
| --- | --- | --- |
|  | Calculated | Found |
| Nitrogen_____per cent__ | 2.20 | 2.17 |
| Sulfur_____do____ | 5.03 | 5.18 |
| Sulfated ash_____do____ | 22.3 | 24.0 |
| Saponification number_____ | 176 | 175.2 |

Calculated purity, 99%.

*Example 2.—N-octadecyl N-(disodium sulfosuccinyl) diethyl aspartate*

900 g. of diethyl maleate was added to a solution of 1325 g. of technical octadecylamine in 1500 cc. of tertiary butanol. After standing for 50 hours the formation of diethyl N-octadecyl aspartate was 95.5% complete. To this solution was added 500 g. of maleic anhydride and the reaction mixture kept at 50–70° C. until the reaction was substantially complete. The solvent was removed by distillation under reduced pressure. The liquid residue was then slowly poured into a hot solution of 650 g. of sodium sulfite in 5100 cc. of water. After standing for 48 hours the slightly turbid solution was filtered to give a clear, stable, foaming solution containing 37.5% N-octadecyl N-(disodium sulfosuccinyl) diethyl aspartate.

*Example 3.—N-octadecyl N-(disodium sulfosuccinyl) di-isopropyl aspartate*

20 g. of di-isopropyl maleate was added to a solution of 28 g. of technical octadecylamine dissolved in 50 cc. of tertiary butanol and the mixture allowed to stand at room temperature for 113 hours at the end of which time di-isopropyl N-octadecyl aspartate was formed in a 95% yield. 10 g. of maleic anhydride was added slowly with agitation to the above solution at a temperature between 50–60° C. This solution was heated to 85–90° C. and maintained at this temperature for approximately one hour to insure complete reaction. The product was slowly poured into a hot solution of 13 g. of sodium sulfite dissolved in 150 cc. of water. Upon evaporation of the liquid constituents from the reaction product, 70 g. of a soft yellow wax was obtained. The product was easily soluble in water to give a clear solution having a pH of 7.5.

Chemical analysis of the product gave the following results which check closely with the theoretical values.

|  | Analysis | |
| --- | --- | --- |
|  | Calculated | Found |
| Nitrogen_____per cent__ | 2.02 | 2.01 |
| Sulfur_____do____ | 4.62 | 4.95 |
| Sulfated ash_____do____ | 20.5 | 21.0 |
| Saponification number_____ | 161.5 | 156.3 |

Calculated purity, 97%.

Example 4.—N-octadecyl N-(disodium sulfosuccinyl) diamyl aspartate 25.6 g. of di-n-amyl maleate was added to a solution containing 28 g. of technical octadecylamine dissolved in 50 cc. of tertiary butanol. This mixture was allowed to stand at room temperature for 112 hours at which time the formation of di-n-amyl N-octadecyl aspartate was 94% complete. 10 g. of maleic anhydride was added slowly with stirring to the above solution and the mixture kept at 50–60° C. When the addition was complete the mixture was heated to 85–90° C. for one hour to insure completion of reaction. This product was added with thorough mixing to a solution of 13 g. of sodium sulfite dissolved in 250 cc. of hot water. The solution was then evaporated leaving as a residue 75 g. of a white waxy solid. This product dissolved easily in water to give a clear foaming solution of pH 7.0.

Chemical analysis of the product gave the following results:

|  | Analysis | |
| --- | --- | --- |
|  | Calculated | Found |
| Nitrogen _____ per cent__ | 1.87 | 1.85 |
| Sulfur _____ do____ | 4.27 | 4.38 |
| Sulfated ash _____ do____ | 19.0 | 20.1 |
| Saponification number _____ | 149.5 | 142.6 |

Calculated purity, 95%.

Example 5.—N-octadecyl N-(disodium sulfosuccinnyl) disodium aspartate 100 cc. of an aqueous solution containing 39 g. of N-octadecyl N-(disodium sulfosuccinyl) diethyl aspartate prepared as in Example 2 was saponified by adding 5.5 g. NaOH dissolved in 9.5 cc. of water. After standing for 2 hours at room temperature, the saponification was complete and the solution was adjusted to a pH of 7.0 by the addition of HCl. The solution was then concentrated and 37 g. of a cream-colored soaplike powder obtained which consisted principally of N-octadecyl N-(disodium sulfosuccinyl) disodium aspartate.

Example 6.—N-octadecyl N-(disodium sulfosuccinyl) disodium aspartate 467.5 cc. of a tertiary butanol solution containing 0.5 mols of dimethyl-N-octadecyl aspartate prepared as described in the first part of Example 1 was treated with 100 cc. of an aqueous solution containing 41.5 g. of NaOH. After standing for one hour the solvents were evaporated by heating on a steam bath and 217 g. of disodium N-octadecyl aspartate of 93% purity was obtained. 115.5 g. of this crude product was suspended in 200 cc. of warm tertiary butanol and 25 g. of maleic anhydride was added thereto in small portions with stirring. The maleamic solution was then slowly poured with stirring into a hot solution of 32.5 g. of sodium sulfite in 250 cc. of hot water. After evaporation of the solvents a theoretical yield of N-octadecyl N-(disodium sulfosuccinyl) disodium aspartate of the formula:

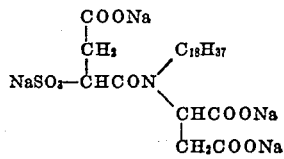

was obtained. The product was a cream-colored soap-like powder, easily soluble in water to give a strongly foaming solution having good wetting properties.

Example 7.—N-octadecyl N-(disodium sulfosuccinyl) sodium aspartate 39 g. of N-octadecyl N-(disodium sulfosuccinyl) diethyl aspartate (prepared as in Example 2) was dissolved in 60 ml. of water and 2.5 g. of sodium hydroxide, dissolved in 5 ml. of water, was added. The solution was allowed to stand for one hour at room temperature. At the end of this time the pH of the solution was 7.0. The water was evaporated to give 38 g. of a cream-colored soap-like solid readily soluble in water to give a clear foaming solution. The product had the formula:

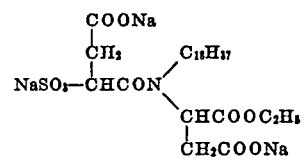

Example 8.—N-butyl N-(disodium sulfosuccinyl) dimethyl aspartate 86.8 g. (0.4 mol) of N-butyl dimethyl aspartate was added to 40 g. (0.4 mol+2% excess) of maleic anhydride at 30° to 75° C. The reaction is exothermic. The resulting maleamic acid was obtained as a clear yellow syrup which was poured into a hot solution of 52 g. (0.4 mol+4% excess) of sodium sulfite in 200 ml. of water and dissolved rapidly to give a clear, colorless, non-foaming solution. The mixture was kept at 80–90° C. for one hour to insure completion of the sulfonation and then evaporated. After drying overnight at 105° C., 178 g. of a brittle, salmon-colored, hygroscopic solid was obtained. This compound is very soluble in water but a 1% aqueous solution displays no foaming nor wetting properties. Its formula is as follows:

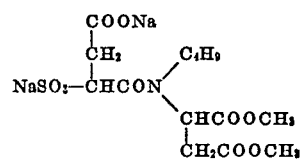

Example 9.—N-amoxypropyl N-(disodium sulfosuccinyl) diamyl aspartate 80 g. (0.2 mol) of N-amoxypropyl diamyl aspartate was added slowly with stirring to 20 g. (0.2 mol+2% excess) of molten maleic anhydride, keeping the temperature between 55° and 70° C. The maleamic acid was then poured into a hot solution of 26 g. (0.2 mole+4% excess) of sodium sulfite in 150 ml. of water. After heating at 80°–90° C. for one hour, the solution was concentrated on a steam bath and the product finally dried at 95° C. overnight. Its formula is as follows:

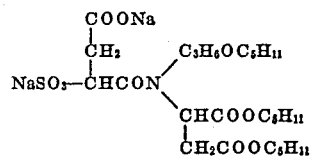

Example 10.—N (β hydroxyethyl) N-(disodium sulfo -2,5- endomethylenehexahydrophthalyl) dihexadecyl aspartate 112 g. (0.2 mol) dihexadecyl maleate was dissolved by heating in 160 ml. t-butanol and there was added 12 g. (0.2 mol) of monoethanolamine at 85–86° C. At the end of 7 hours at 86° C. the formation of the aspartate ester was 96% complete. The solution was then cooled to 65–70° C. and there was added 35 g. (0.2 mol+5% excess) of 2,5-endomethylene 1,2,5,6-tetrahydrophthalic anhydride in small portions. The reaction mixture was heated at 80–85° C. for 2 hours to complete the acylation. The solution was then added with stirring to a hot solution of 26 g. (0.2 mol+4% excess) of sodium sulfite in 300 ml. of water, followed by 300 ml. of butanol and 650 ml. of methanol. The turbid mixture was heated to boiling with stirring. After approximately 1 hour heating, a waxy precipitate formed and the liquid phase began to clear. Heating was continued for another hour. The solution was concentrated on the steam bath to a thin syrup. This was dried at 90° C. to yield 185 g. of a yellow waxy solid having the formula:

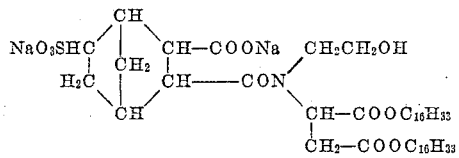

*Example 11.—N-dodecyl N-(disodium sulfosuccinyl) dimethyl aspartate*

105 g. (0.76 mol) dimethyl maleate was added with stirring to a solution of 142 g. (0.76 mol) of n-dodecylamine in 250 ml. of t-butanol. The temperature rose to 37° C. The mixture was allowed to stand at room temperature for 69 hours at which time the reaction was more than 99% complete. The solution was then warmed to 60° C. and there was then added in small portions 79 g. (0.76 mol+2% excess) of maleic anhydride with stirring. The reaction mixture was heated to 85–90° C. for 1 hour to complete the acylation. The reaction mixture was sulfonated by pouring slowly, with stirring, into a hot solution of 100 g. (0.76 mol+4% excess) of sodium sulfite in 375 ml. of water. After heating for 10 minutes the turbid solution became clear. This solution was concentrated on a steam bath and dried at 90° C. to yield 395 g. of a cream-colored hygroscopic solid having the formula:

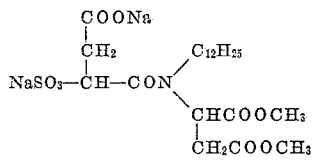

*Example 12.—N-dodecyl N - (sulfosuccinyl) dimethyl aspartate*

30 g. of the disodium salt obtained in the previous example was dissolved in 900 ml. of hot 70% ethanol. The solution was cooled to room temperature and there was added with stirring a solution of 5.6 g. (0.054 mol) of concentrated sulfuric acid in 200 ml. of 95% alcohol. After standing for one-half hour, the precipitated sodium sulfate was filtered off. The filtrate contained the free sulfosuccinamic acid available for use as such or for conversion to other salts.

*Example 13.—N-dodecyl N-(zinc sulfosuccinyl) dimethyl aspartate*

To 550 ml. of an alcohol solution containing 0.027 mol of N-dodecyl N-(sulfosuccinyl) dimethyl aspartate was added 10 g. of powdered zinc oxide and the mixture was placed in a shaking machine for 12 hours. The solution then had a pH of 6.1. The excess zinc oxide was filtered off using filter-aid and the filtrate was evaporated on the steam bath. The residue was dried at 90° C. to give 12 g. of a slightly yellow powder.

*Example 14.—N-dodecyl N-(ditriethanolamine sulfosuccinyl) dimethyl aspartate*

To 550 ml. of an alcoholic solution containing 0.027 mol. of N-dodecyl N-(sulfosuccinyl) dimethyl aspartate an aqueous solution of triethanolamine was added to the point of neutralization. The solution was concentrated on the steam bath and the product dried in an oven at 90° C. There was obtained 12 g. of the triethanolammonium salt as a brownish paste.

*Example 15.—N-butyl N-(diammonium sulfosuccinyl) di-octyl aspartate*

To a solution of 22 g. (0.3 mol) of n-butylamine in 150 ml. of t-butanol was added 102 g. (0.3 mol) of di-n-octyl maleate with stirring. The reaction was 95.5% complete in 72 hours at room temperature. It was then heated to 70° C. and there was added in small portions with stirring 30 g. (0.3 mol+2% excess) of maleic anhydride. The reaction mixture was heated at 85–90° C. for one and one-half hours to complete the addition. It was then poured with stirring into a solution of 0.6 mol of ammonium bisulfite in 250 ml. of water followed by the addition of 100 ml. of 95% ethanol. The resulting two phase mixture was heated to 75–80° C. with stirring until it became homogeneous and clear. This required 40 minutes. Heating was continued for another 30 minutes to insure complete sulfonation and the foaming solution was evaporated on the steam bath. The product was dried at 90° C. There was obtained 176 g. of a waxy yellowish, hygroscopic solid having the formula:

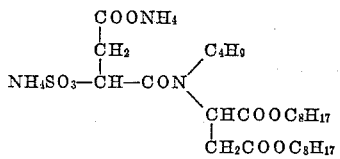

The wetting properties of some of the compounds just described may be illustrated by the following results obtained from the Draves Sinking Time test. This test measures the wetting power of the solution in terms of the time necessary for a weighted skein of unbleached cotton yarn to sink when immersed in the solution.

*Table I.—Draves test at 30° C.*

| Product of— | Concentration in grams per liter | | | |
| --- | --- | --- | --- | --- |
| | 5 g. | 2.5 g. | 1.25 g. | 1.0 g. |
| | Seconds | Seconds | Seconds | Seconds |
| Example 1 | 37.6 | 44.4 | 54 | |
| Example 2 | 27.0 | 35.3 | 39 | 48 |
| Example 3 | 18.3 | 25.2 | 34.2 | |
| Example 4 | 50.6 | 73.7 | 144 | |
| Example 5 | 63 | 72 | | 104 |
| Example 9 | | <10 | | 54.6 |
| Example 11 | 18 | 29 | | 81 |
| Example 13 | 9 | 19 | | 55 |
| Example 14 | 55 | 120 | | 310 |
| Example 15 | 5 | 10 | | 15 |

The foaming power and foam stability of solutions of some of the above surface active agents were tested by passing 600 cc. of air through 400 cc. of an aqueous solution containing one gram per liter of the agent being tested. The volume of foam initially produced and the volume of the same foam after standing for 2, 5 and 10 minutes was measured. The sum of the four values divided by 25 is designated as the foam number. These tests were also conducted with the solutions at 30° C. The results of this series of tests were as follows:

Table II.—Foaming characteristics

| Product of— | Foam Number |
|---|---|
| Example 1 | 64.2 |
| Example 2 | 69.2 |
| Example 3 | 70.0 |
| Example 4 | 52.0 |
| Example 5 | 97.0 |
| Example 10 | 71.0 |
| Example 11 | 85.0 |
| Example 13 | 95.0 |
| Example 14 | 70.0 |
| Example 15 | 97.0 |

This is a continuation-in-part of my application Serial Number 448,649, filed June 26, 1942, now abandoned.

I claim:

1. Compounds having the general formula

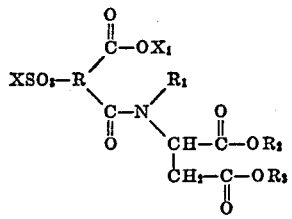

in which X and $X_1$ are members of the group consisting of hydrogen and cationic salt-forming radicals, R is the residue of an aliphatic polycarboxylic acid, $R_1$ is a member of the group consisting of alkyl, alkoxyalkyl and hydroxyalkyl radicals of from 1 to 20 carbon atoms and $R_2$ and $R_3$ are members of the group consisting of hydrogen, alkyl and cationic salt-forming radicals.

2. Compounds having the general formula

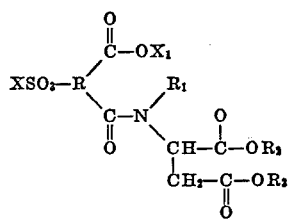

in which X and $X_1$ are members of the group consisting of hydrogen and cationic salt-forming radicals, R is the residue of an aliphatic polycarboxylic acid, $R_1$ is an alkyl radical of from 8 to 18 carbon atoms and $R_2$ and $R_3$ are members of the group consisting of hydrogen, alkyl and cationic salt-forming radicals; said compounds having wetting and detergent properties.

3. Compounds having the general formula

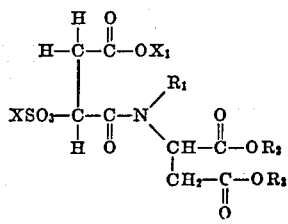

in which X and $X_1$ are members of the group consisting of hydrogen and cationic salt-forming radicals, $R_1$ is a member of the group consisting of alkyl, alkoxyalkyl and hydroxyalkyl radicals of from 1 to 20 carbon atoms and $R_2$ and $R_3$ are members of the group consisting of hydrogen, alkyl and cationic salt-forming radicals.

4. Compounds having the general formula:

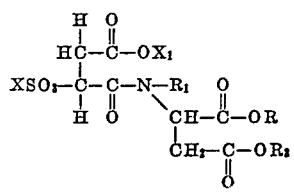

in which X and $X_1$ are members of the group consisting of hydrogen and cationic salt-forming radicals, and $R_1$, $R_2$ and $R_3$ are alkyl radicals having a total of at least 12 carbon atoms; said compounds having wetting and detergent properties.

5. Compounds having the general formula:

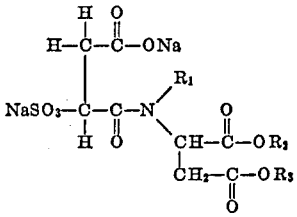

in which $R_1$, $R_2$ and $R_3$ are alkyl radicals having a total of at least 12 carbon atoms; said compounds having wetting and detergent properties.

6. Compounds having the general formula:

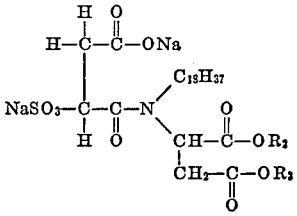

in which $R_2$ and $R_3$ are alkyl radicals; said compounds having wetting and detergent properties.

7. N-octadecyl N-(disodium sulfosuccinyl) diisopropyl aspartate.

8. N-amoxypropyl N-(disodium sulfosuccinyl) diamyl aspartate.

9. N-octadecyl N-(disodium sulfosuccinyl) disodium aspartate.

KATHRYN L. LYNCH.

REFERENCES CITED

The following references are of record in the file of this patent:

UNITED STATES PATENTS

| Number | Name | Date |
|---|---|---|
| 2,028,091 | Jaeger | Jan. 14, 1936 |
| 2,200,220 | Reppe | May 7, 1940 |
| 2,238,902 | Katzman et al. | Apr. 22, 1941 |
| 2,252,401 | Jaeger | Aug. 12, 1941 |
| 2,306,095 | Valjavec | Dec. 22, 1942 |
| 2,322,783 | Katzmann et al. | June 29, 1943 |